US010120654B2

(12) United States Patent
Bernelas et al.

(10) Patent No.: US 10,120,654 B2
(45) Date of Patent: *Nov. 6, 2018

(54) DOMAIN SPECIFIC LANGUAGE DESIGN

(75) Inventors: Jean Michel Bernelas, Valbonne (FR); Sylvain Dehors, La Gaude (FR); Cyril Mathey, Gentilly (FR); Stephane Mery, Valbonne (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 402 days.

This patent is subject to a terminal disclaimer.

(21) Appl. No.: 13/430,217

(22) Filed: Mar. 26, 2012

(65) Prior Publication Data

US 2013/0031529 A1   Jan. 31, 2013

Related U.S. Application Data

(63) Continuation of application No. 13/284,715, filed on Oct. 28, 2011.

(30) Foreign Application Priority Data

Jul. 26, 2011  (EP) .................................... 11290341

(51) Int. Cl.
G06F 9/44 (2006.01)
G06F 8/30 (2018.01)
G06F 8/41 (2018.01)

(52) U.S. Cl.
CPC ................ *G06F 8/31* (2013.01); *G06F 8/427* (2013.01)

(58) Field of Classification Search
CPC .......................................................... G06F 9/44
USPC ........................................ 717/100, 143, 144
See application file for complete search history.

(56) References Cited

U.S. PATENT DOCUMENTS

| 4,689,737 | A  * | 8/1987 | Grant ................................. 704/8 |
| 5,903,898 | A  * | 5/1999 | Cohen et al. .................. 707/648 |
| 6,292,773 | B1 * | 9/2001 | Bernardes et al. ............... 704/9 |
| 6,442,524 | B1   | 8/2002 | Ecker et al. |
| 6,754,626 | B2   | 6/2004 | Epstein |
| 6,999,934 | B2   | 2/2006 | Gluzberg et al. |

(Continued)

FOREIGN PATENT DOCUMENTS

| WO | 0229783 A1 | 4/2002 |
| WO | 02089113 A1 | 11/2002 |
| WO | 2009150591 A1 | 12/2009 |

OTHER PUBLICATIONS

Faizan Javed, Techniques for Context-Free Grammar Induction and Applications, A Dissertation of the University of Alabama at Birmingham, pp. 1-183, 2007, URL: http://www.cis.uab.edu/softcom/dissertations/JavedFaizan.pdf.

(Continued)

*Primary Examiner* — Jae Jeon
(74) *Attorney, Agent, or Firm* — Fabian VanCott; Steven L. Nichols

(57) ABSTRACT

A method for domain specific language design includes, with a physical computing system, receiving from a user, a number of annotations for at least one of a set of statements within a problem domain, the annotations identifying a set of elements within the statement. The method further includes forming a set of grammar rules for the problem domain based on the annotations, and parsing the set of statements using the set of grammar rules.

4 Claims, 6 Drawing Sheets

(56) References Cited

U.S. PATENT DOCUMENTS

| | | |
|---|---|---|
| 7,275,029 B1 | 9/2007 | Gao et al. |
| 7,685,171 B1* | 3/2010 | Beaverson et al. .... 707/999.202 |
| 2002/0013155 A1 | 1/2002 | Jamthe et al. |
| 2003/0004716 A1* | 1/2003 | Haigh .................... G10L 15/10 704/238 |
| 2003/0120649 A1* | 6/2003 | Uchino ............... G06F 17/3061 |
| 2003/0121026 A1* | 6/2003 | Wang .................. G06F 17/271 717/124 |
| 2003/0145310 A1* | 7/2003 | Thames .................... G06F 8/73 717/123 |
| 2003/0212544 A1* | 11/2003 | Acero .................. G06F 17/241 704/9 |
| 2005/0273315 A1* | 12/2005 | Laitila ...................... G06F 8/51 704/9 |
| 2007/0033004 A1 | 2/2007 | Bangalore et al. |
| 2007/0180426 A1 | 8/2007 | Moulckers et al. |
| 2008/0125043 A1* | 5/2008 | Karmanenko ........ H04W 12/10 455/41.2 |
| 2009/0024660 A1* | 1/2009 | Borgsmidt ........ G06F 17/30592 |
| 2009/0249312 A1 | 10/2009 | Liao et al. |
| 2009/0254337 A1* | 10/2009 | Sprecher ............... G06F 17/271 704/9 |
| 2009/0271353 A1* | 10/2009 | Fei ..................... G06F 17/2247 706/47 |
| 2009/0281791 A1 | 11/2009 | Li |
| 2009/0293046 A1* | 11/2009 | Cheriton ................ G06F 8/437 717/136 |
| 2010/0037149 A1* | 2/2010 | Heath .......................... 715/753 |
| 2010/0185984 A1* | 7/2010 | Wright et al. ............... 715/833 |
| 2010/0191519 A1 | 7/2010 | Morton et al. |
| 2010/0228538 A1* | 9/2010 | Yamada ............................ 704/9 |
| 2010/0293451 A1* | 11/2010 | Carus ............................ 715/230 |
| 2011/0029857 A1* | 2/2011 | Li ....................... G06F 17/2705 715/234 |
| 2012/0107779 A1* | 5/2012 | Halton .................... G06F 17/10 434/188 |
| 2015/0104762 A1* | 4/2015 | Luke .................... G09B 17/00 434/169 |

OTHER PUBLICATIONS

Guadalupe Aguado De Cea et al, Natural Language-Based Approach for Helping in the Reuse of Ontology Design Patterns, URL:http://www.springerlink.com/content/7425877l1630n452/, Abstract Only, Lecture Notes in Computer Science, 2008, vol. 5268/2008, 32-47, DOI: 10.1007/978-3-540-87696-0_6.

Fuchs et al, Syecifying Logic Programs in Controlled Natural Language, Department of Computer Science, University of Zurich, URL:http://arxiv.org/abs/cmp-lg/9507009, Compulognet/Elsnet/Eagles Workshop on Computational Logic for Natural Language Processing, Edinburgh, Apr. 3-5, 1995, Abstract Only.

* cited by examiner

Statements (200)

Statement 1 (202-1)

The album "Album Name 1" was created by "Artist A" in 2005.

Statement 2 (202-2)

The album "Album Name 2" was created by "Artist B" in 2007.

Statement 3 (202-3)

The album "Album Name 3" was created by "Artist C".

Statement 4 (202-4)

The album "Album Name 4" was created by "Artist D" in 2003 and was produced by "Producer A".

Statement 5 (202-5)

The album "Album Name 5" was created by "Artist C" in 2008 and was sold for $15.

Fig. 2A

Table (206)

| # | Album Name | Artist | Producer | Year | Price |
|---|---|---|---|---|---|
| 1 | Album Name 1 | Artist A | | 2005 | |
| 2 | Album Name 2 | Artist B | | 2007 | |
| 3 | Album Name 3 | Artist C | | | |
| 4 | Album Name 4 | Artist D | Producer A | 2003 | |
| 5 | Album Name 5 | Artist C | | 2008 | $15 |

DOMAIN SPECIFIC LANGUAGE DESIGN

RELATED APPLICATIONS

The present application is a continuation of and claimed priority under 35 U.S.C. § 120 to U.S. application Ser. No. 13/284,715, filed Oct. 28, 2011, entitled "DOMAIN SPECIFIC LANGUAGE DESIGN," which is incorporated herein by reference in its entirety. Pursuant to 35 U.S.C. § 119(b) and 37 C.F.R. § 1.55(a), U.S. application Ser. No. 13/284,715 corresponds to and claims the priority of European Patent Application No. 11290341.4 filed on Jul. 26, 2011, the disclosure of which is incorporated herein by the reference in its entirety.

BACKGROUND

Aspects of the present invention relate in general to domain specific language, and more particularly, to methods and systems for intuitively designing a domain specific language. A domain specific language is a computer programming language used to solve problems within a particular problem domain. A problem domain refers to the specific problem or task that a particular software application is designed to perform. For example, a particular software application may be designed to extract data regarding music albums from natural language describing those albums. Thus, the problem domain for such a software application would be the task of extracting data from the natural language and formatting it for use in a database.

The process of designing a domain specific language is often done by persons who are well experienced in the field of computer science and language analytics. For some problem domains such as the example of extracting data related to music albums, it may not be cost effective to hire such experts to develop the appropriate domain specific language. It is often only economical to create domain specific languages for problem domains that are of a sufficient scale and complexity to warrant the cost of creating an appropriate domain specific language.

BRIEF SUMMARY

A method for domain specific language design includes, with a physical computing system, receiving from a user, a number of annotations for at least one of a set of statements within a problem domain, the annotations identifying a set of elements within the statement, with the physical computing system, forming a set of grammar rules for the problem domain based on the annotations, and with the physical computing system, parsing the set of statements using the set of grammar rules.

A computing system includes a processor and a memory communicatively coupled to the processor. The processor is configured to receive from a user, a number of annotations for at least one of a set of statements within a problem domain, the annotations identifying a set of elements within the statement, form a set of grammar rules for the problem domain based on the annotations, and parse the set of statements using the set of grammar rules.

A computer program product for domain specific language design includes a computer readable storage medium having computer readable code embodied therewith. The computer readable program code includes computer readable program code configured to receive from a user, a number of annotations for at least one of a set of statements within a problem domain, the annotations identifying a set of elements within the statement, computer readable program code configured to form a set of grammar rules for the problem domain based on the annotations, and computer readable program code configured to parse the set of statements using the set of grammar rules.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 2A is a diagram showing an illustrative set of statements within the same problem domain, according to one example of principles described herein.

FIG. 2B is a diagram showing an illustrative table of data that can be extracted from statements within a problem domain, according to one example of principles described herein.

Throughout the drawings, identical reference numbers designate similar, but not necessarily identical, elements.

DETAILED DESCRIPTION

Figure 1:
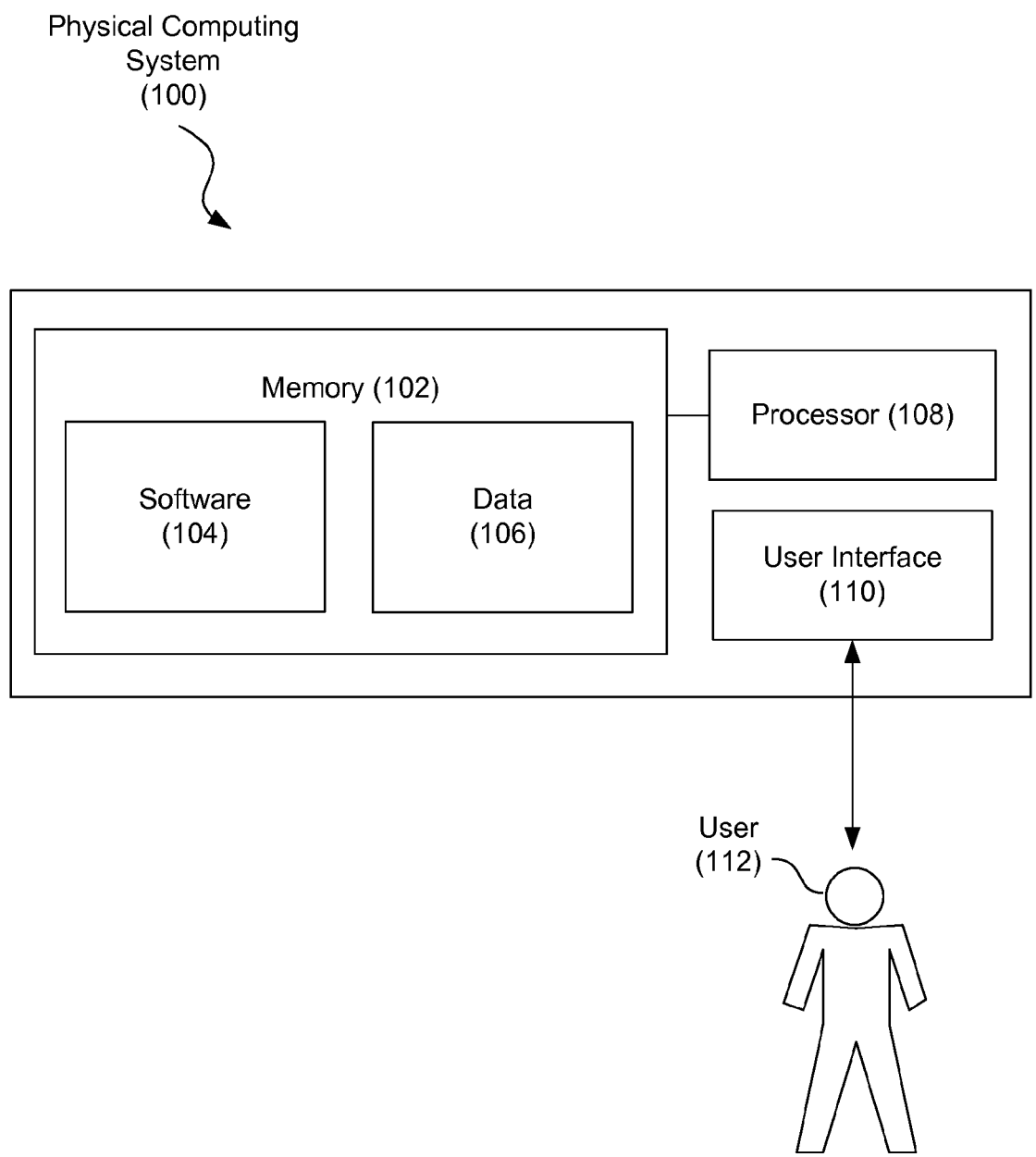
FIG. 1 is a diagram showing an illustrative physical computing system, according to one example of principles described herein.

As mentioned above, the process of designing a domain specific language is often done by persons who are well educated in the field of computer science and language analytics. For some problems such as the example of extracting data related to music albums, it may not be cost effective to hire such experts to develop the appropriate domain specific language. It is often only economical to create domain specific languages for problem domains that are of a sufficient scale to warrant the cost of creating an appropriate domain specific language.

In light of this and other issues, the present specification discloses methods and systems for providing a user with an intuitive mechanism for creating a domain specific language. Thus, persons who may not be as well versed in computer science or language analytics will be able to create domain specific languages for specific problem domains. This allows such users to more economically develop domain specific languages for the example problem domain of extracting data related to music albums.

According to certain illustrative examples, a user will go through a set of example statements for a particular problem domain and assign annotations to sets of elements within those statements. A set of elements may include one or more elements. An element may be a word, number or other such element within a statement. An annotation may identify a particular set of elements for a variety of purposes. Using the annotations provided manually by a user, a set of grammar rules can be derived.

These grammar rules can then be used to parse each of the statements within the set of example statements. The set of grammar rules is further developed as the user iteratively progresses through each of the example statements and provides additional annotations when appropriate. Upon processing each of the example statements, the domain specific language may be ready for use on a dataset within the problem domain for which the domain specific language was designed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to the figures, FIG. 1 is a diagram showing an illustrative physical computing system (100) that can be used to design domain specific languages. According to certain illustrative examples, the physical computing system (100) includes a memory (102) having software (104) and data (106) stored thereon. The physical computing system (100) also includes a processor (108) and a user interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106).

The physical computing system (100) also includes a processor (108) for executing the software (104) and using or updating the data (106) stored in memory (102). The software (104) may include an operating system. An operating system allows other applications to interact properly with the hardware of the physical computing system. Such other applications may include a domain specific language design application.

A user interface (110) may provide a means for the user (112) to interact with the physical computing system (100). The user interface may include any collection of devices for interfacing with a human user (112). For example, the user interface (110) may include an input device such as a keyboard, mouse, trackpad, or touchscreen and an output device such as a monitor.

FIG. 2A is a diagram showing an illustrative set of statements (200) within the same problem domain. In this case, the problem domain is task of extracting information about music albums from natural language. Each statement includes information indicating the name of the album and the artist who created that album. Some statements include additional information such as the year the album was released, the name of the producer, and the price at which the album was initially sold.

Statement 1 (202-1) states "The album "Album Name 1" was created by "Artist A" in 2005." Statement 2 (202-2) states "The album "Album Name 2" was created by "Artist B" in 2007." Thus, both statements 1 and 2 include the album name, artist, and release year. Statement 3 (202-3), which does not include a release year, states "The album "Album Name 3" was created by "Artist C."" Statement 4 (202-4), which includes a producer name, states "The album "Album Name 4" was created by "Artist 2" in 2003 and was produced by Producer A." Statement 5 (202-5), which does not include a producer but does include an initial sale price, states "The album "Album Name 5" was created by "Artist C" in 2003 and was sold for $15."

FIG. 2B is a diagram showing an illustrative table (206) of data that can be extracted from statements within a problem domain. As mentioned above, it may be desirable to extract information from the natural language of statements within a particular problem domain. Each entry within the table (206) corresponds to a statement from FIG. 2A.

The table (206) includes an ordinal number column (208), an album name column (210), and artist column (212), a producer column (214), a year column (216), and a price column (218). The information within the natural language of the statements (200) is placed into the table accordingly. The process of extracting the data from the statements (200) is referred to as parsing. Although the parsed data is shown as being placed within a table, methods and systems embodying principles described herein may use the data in other ways upon extracting the data from the statements (200).

Figure 3:
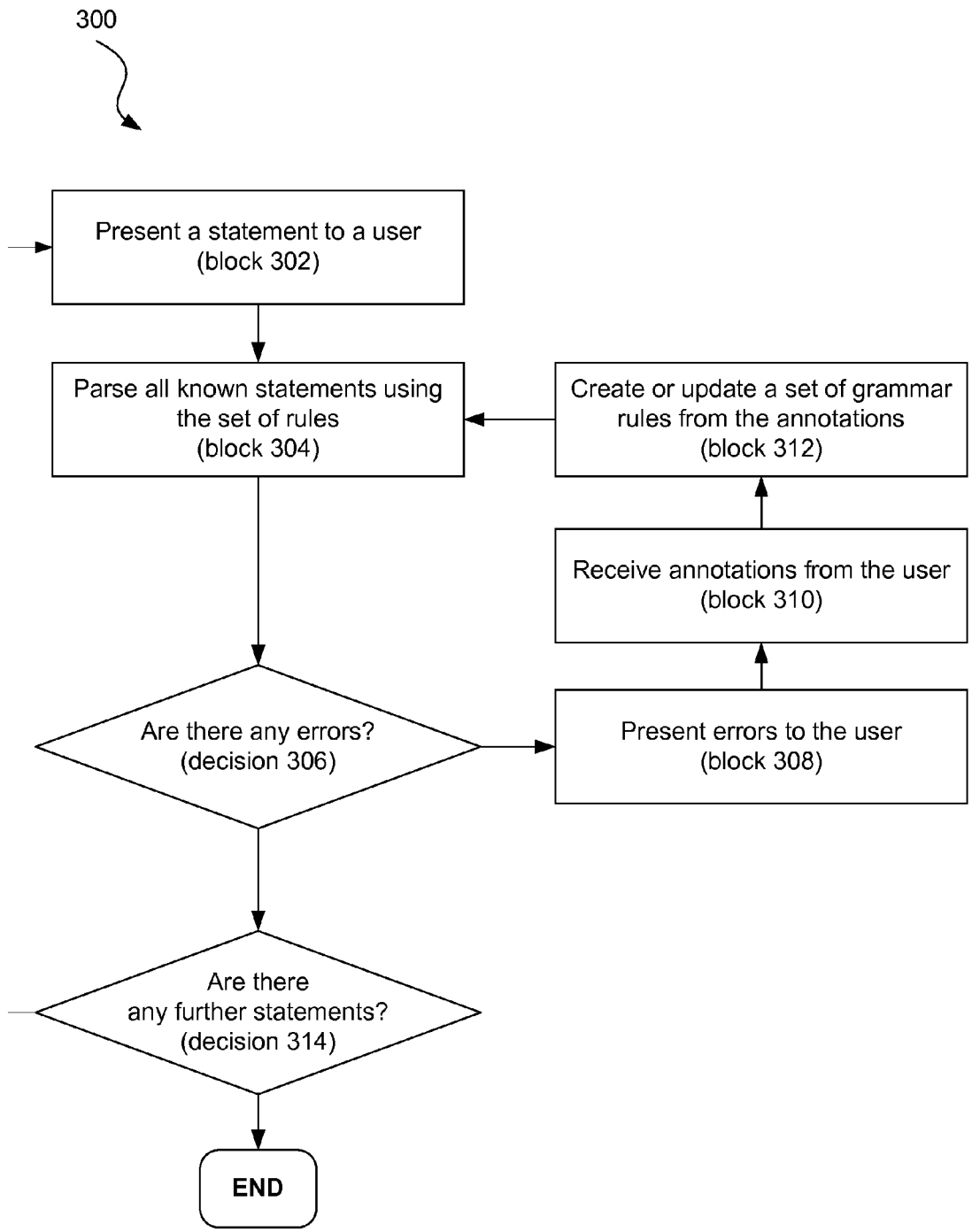
FIG. 3 is a flowchart showing an illustrative process for designing a domain specific language, according to one example of principles described herein.

FIG. 3 is a flowchart showing an illustrative process for designing a domain specific language. According to certain illustrative examples, the process (300) begins when an example statement from a set of example statements is presented (block 302) to a user. The example statement may be displayed to the user on a display device of a user interface such as a monitor or a touch-screen.

The domain specific language design application will then progress through each of the example statements and parse (block 304) those statements using a set of grammar rules. For each statement, it will be determined (decision 306) whether or not there were any errors parsing that statement using the current set of grammar rules.

If it is determined (decision 306, YES) that there is indeed an error, then the domain specific language application will present (block 308) these errors to the user. For the first statement that is parsed, the grammar set will be empty and thus there will be errors. The user may then be provided with a mechanism to provide annotations to handle these errors. The domain specific language design application may then receive (block 310) annotations from the user.

These annotations may be received through interactions the user makes within a graphical user interface used to display the statement. For example, the user may use an input device such as a keyboard, mouse, or touch-screen device to select words, numbers and other elements within an example statement. The user can then use various tools provided by the domain specific language application to properly annotate those elements. A more detailed description of the annotation process will be provided below with the text accompanying FIGS. 4A-4C.

When the user has finished annotating a particular statement, the domain specific language design application uses those annotations to create or update (block 312) the set of grammar rules. These grammar rules will determine how a domain specific language extracts data from the set of example statements within the appropriate problem domain. For example, if a grammar rule defines how an album name is expressed within a statement, then that grammar rule can be used to determine what element within a statement corresponds to the album name.

When the grammar rules are updated, then the domain specific language design application will progress through each of the example statements again and parse those statements using the updated set of grammar rules. It may be the case that when re-parsing the example statements, the domain specific language design application will find elements that do not fit with the current grammar rules. This will cause more errors. There errors will again be presented (block 308) to the user. The user then repeats the cycle of annotating the statements to handle those errors so that the set of grammar rules can be updated. This process continues until there are no more errors found when parsing the example statements.

When it is determined (decision 306, NO) that there are no errors when parsing the example statements, then the domain specific language design application will determine (decision 314) whether there are any more statements to be processed. If it is determined (decision 314, NO) that there are no more statements to be processed, then the domain specific language can be considered complete.

If it is determined (decision 314, YES) that there are more example statements to be processed, then the domain specific language design application will add those statements to the set of example statements and continue the process whereby the user makes annotations to handle errors in order to update the set of grammar rules. Thus, this process of parsing all of the example statements will continue until each example statement can be completely parsed without any errors.

In some cases, the domain specific language design application may go through and parse each statement within the set of example statements before presenting any errors to the user. Upon completing the parsing process, the domain specific language design application may present all of the errors to the user simultaneously. The user may then cycle through each of these errors in any desired order and make annotations to handle those errors. This may allow a user to better determine the scope of a particular error based on how much a particular error recurs. Upon making all the desired annotations to each of the statements, the user can indicate that the set of grammar rules is ready to be updated based on each of the recently made annotations. Using the updated set of grammar rules, the process of parsing each of the statements before presenting the user with any errors recurs until there are no more errors.

Figures 4A, 4B, 4C:
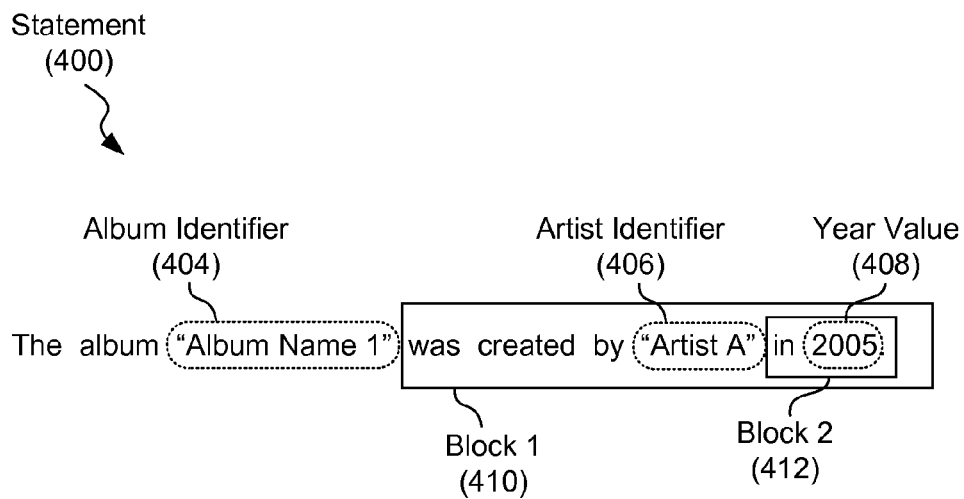
FIGS. 4A and 4B are diagrams showing illustrative annotations to statements within a problem domain, according to one example of principles described herein.
FIG. 4C is a diagram showing an illustrative set of data derived from a statement, according to one example of principles described herein.

FIGS. 4A and 4B are diagrams showing illustrative annotations to statements within a problem domain, according to one example of principles described herein. FIG. 4A illustrates a first statement and the annotations associated therewith which may be provided by a user. The statement is, "The "Album Name 1" was created by 'Artist A' in 2005".

According to certain illustrative examples, a user may annotate certain words as identifiers. An identifier annotation indicates that a particular element such as a word identifies the name of an album. In this case, the album name is annotated with an album identifier annotation (404). Additionally, the artist name is annotated with an artist identifier annotation (406).

One type of annotation is a value annotation. A value annotation may be used to indicate that a certain element or set of elements indicates a value within a predefined format. For example, the value may be a simple integer number. A value may also be used to indicate a date. In some cases, a value may be a word from a discrete set of words used to describe something. For example, a value may be assigned to a color. The discrete set of words for that value would be a list of words describing different colors. In this example, the year is annotated with a year value annotation (408).

One type of annotation is a block annotation. A block is used to indicate a particular portion of a statement that may be used to form a specific grammar rule. For example, Block 1 (410) may describe the "created by" section of the statement which would include grammar rules for determining the artist. A block may also exist within another block annotation. For example, block annotation 2 (412) is within block annotation 1 (410). Block annotation 2 (412) indicates the portion of the statement where the year in which the album was released is described.

A block annotation may be of two varieties. The first variety is an optional block. An optional block indicates that some statements within the problem domain will not include the information within that block. In this example, while all statements will include an artist, only some statements will include the release year. The second variety is a multiple block. A multiple block is one which may appear multiple times throughout a sentence. Thus, the grammar rule that may be derived from the multiple block annotation may allow the domain specific language to handle multiple instances of information within a statement.

When the user is finished annotating a statement, the user may indicate to the application that he or she is done. The domain specific language design application will then create set of grammar rules from these annotations. For example, a grammar rule derived from the annotated statement of FIG. 4A may be that when the words, "The album", are followed by a set of words within quotes, the words within quotes are an album name. In some examples, it may be the case that the album name is not within quotes but is italicized, bolded, or underlined.

With this newly created set of grammar rules, the domain specific language design application will re-parse the statements within the set of example statements. If an example statement can be parsed using the existing grammar rules without any errors, then the application will move on to a subsequent example statement. However, it may be the case that a subsequent statement that is being parsed causes an error. This may be due to new information within the subsequent statement which the grammar rules are not yet adapted to handle.

FIG. 4B is a diagram showing an illustrative statement (420) that causes an error when the grammar rules derived from the annotations of FIG. 4A are used to parse the statement (420). The error occurs because the statement (420) includes additional information that was not present in the statement (400) of FIG. 4A. Specifically, in addition to providing an album name and artist name, the statement (420) provides a producer name as well.

In one example, the text that causes the error may be brought to the attention of the user. This may be done, for example, by highlighting, coloring, underlining. In this example, the text causing the error is bolded. Upon being presented with the statement (420) and the error causing text, the user may annotate the statement (420). Specifically, the user may provide a block annotation (422) to indicate that this portion of the text indicates who produced the album. The user may also annotate a producer identifier to indicate that this text indicates the actual name of the producer. Upon receiving the additional annotations (422, 424), the domain specific language design application can update the grammar rules accordingly. With the grammar rules being updated, the domain specific language should be able to handle statements that describe the producer in such a manner.

FIG. 4C is a diagram showing an illustrative set of data derived from a statement. According to certain illustrative examples, the updated grammar rules may be applied to a further subsequent statement (430). This statement states, "The album "Album Name 3" was created by Artist C" in 2008 and was produced by Producer B." Because the grammar rules have been updated to handle a producer name in addition to the album name, artist name, and a year value, this statement will be properly parsed by the domain specific language.

The example statements illustrated and described above show how one statement may update the grammar rules. As mentioned above, the process of providing statements to a user to be annotated is performed iteratively for an entire set of example statements. The size of the set of example statements may depend on the complexity of the problem domain. In general, a more complex problem domain will involve a greater number of example statements. Conversely, a less complex problem domain will involve a smaller set of example statements. Upon processing each of the example statements, the domain specific language may be used to process an actual dataset to perform the problem with which the domain specific language was intended to work.

The domain specific language may at any time be updated by providing more example statements and having the user manually annotate any of those example statements that are not able to be parsed using the present set of grammar rules. Such methods provide a set of grammar rules that work with the problem domain for which they are designed. Furthermore, the grammar rules within the domain specific language can be crafted by a user that does not necessarily have deep expertise in the field of computer science or language analytics.

Figure 5:
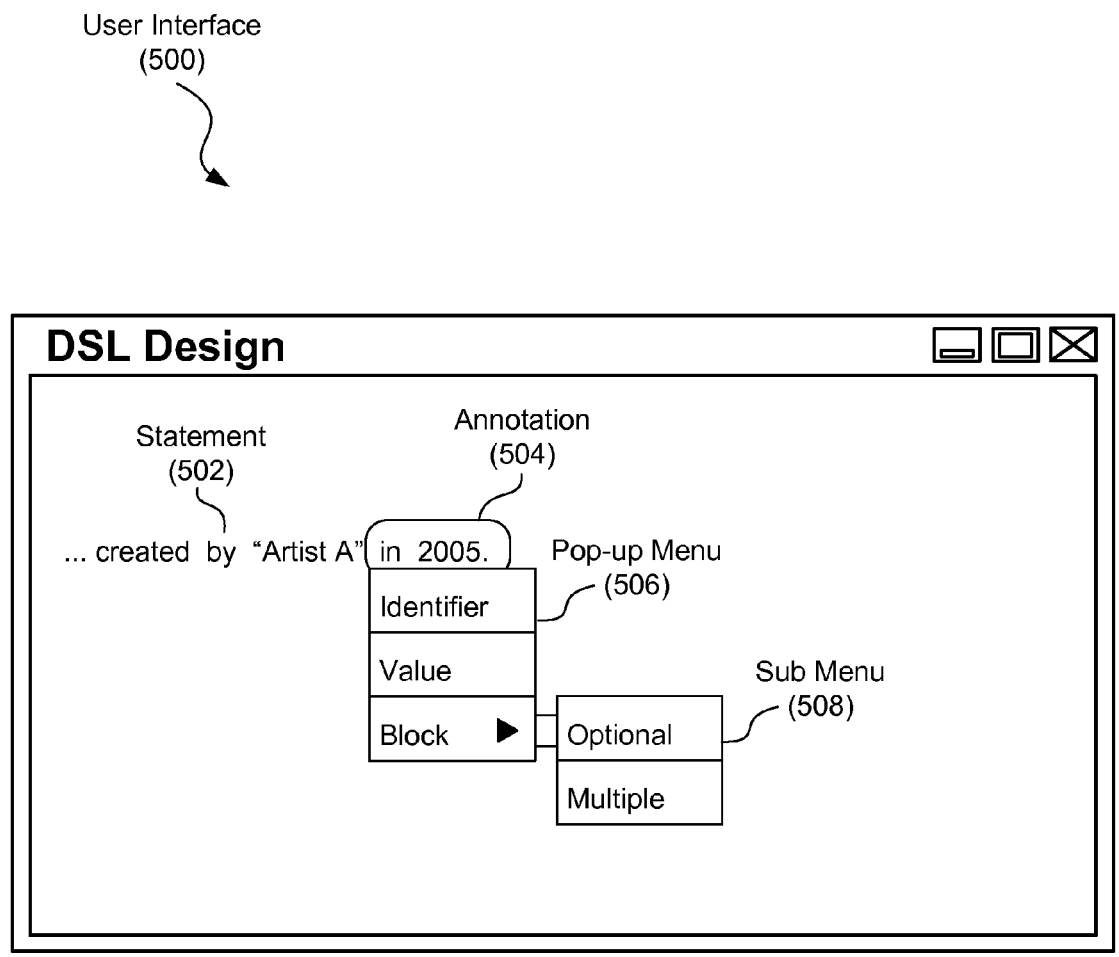
FIG. 5 is a diagram showing an illustrative user interface for a domain specific language design application, according to one example of principles described herein.

FIG. 5 is a diagram showing an illustrative user interface (500) for a domain specific language design application. According to certain illustrative examples, the user interface (500) for a domain specific language application may be embodied as a window. As a statement (502) is displayed to the user, the user may interact with that statement to provide annotations.

For example, using an input device such as a mouse or track-pad, a user may move a cursor to select elements within the statement (502). In one example, a user may select a single element by clicking on that element. To select multiple elements, a user may draw a circle around those multiple elements. Upon selecting one or more elements, the user may cause a pop-up menu (506) to appear. This pop-up menu (506) may provide a list of annotation types. In some cases, if there are variations of a particular annotation, those variations may appear in a sub-menu (508). For example, when selecting the block type of annotation, the user may choose whether that type should be an optional block or a multiple block.

The types of annotations described herein are not intended to be an exhaustive list of all types of annotations that may be used to annotate a statement. Other types of annotations which identify portions of the statement for grammar rule purposes may be used. Furthermore, the manner in which a user interacts with the user interface to annotate a statement may be done through a variety of mechanisms in addition to the mechanisms described herein.

Figure 6:
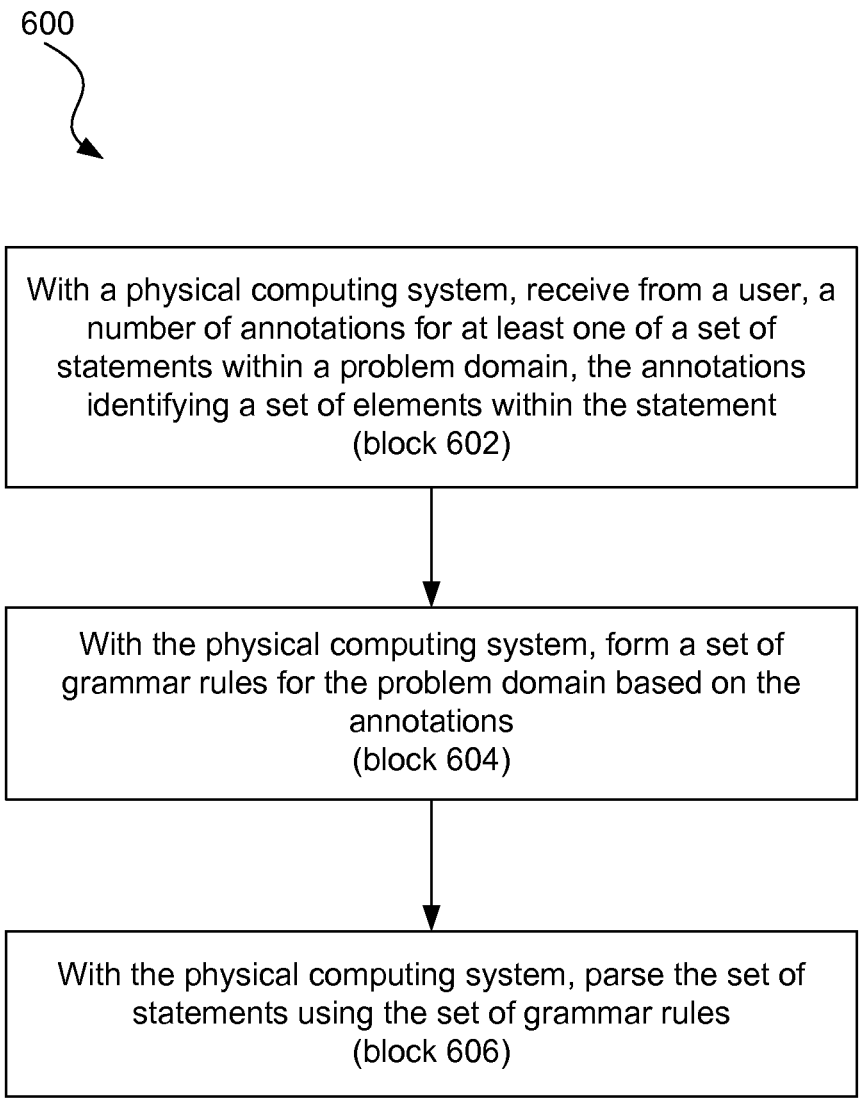
FIG. 6 is a flowchart showing an illustrative method for domain specific language design, according to one example of principles described herein.

FIG. 6 is a flowchart showing an illustrative method for domain specific language design. According to certain illustrative examples, the method includes, with a physical computing system, receiving (block 602) from a user, a number of annotations for at least one of a set of statements within a problem domain, the annotations identifying a set of elements within the statement. The method further includes, with the physical computing system, forming (block 604) a set of grammar rules for the problem domain based on the annotations, and with the physical computing system, parsing (block 606) the set of statements using the set of grammar rules.

In conclusion, through use of methods and systems embodying principles described herein, an intuitive application for designing a domain specific language is realized. A user who may not have deep expertise within the field of computer science of language analytics may design a domain specific language for a specific problem domain. This can make it worth the time and cost to create domain specific languages for simpler problem domains.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for use with a textual data set representing text, the method comprising:
iteratively receiving user selection data sets, with each user selection data set including:
(i) an identification of a portion of text included in the textual data set, and
(ii) an annotation assigned to the respectively associated portion of text, with each annotation including at least one of the following types of annotation value: value, identifier, block;
wherein the block annotation comprises an optional block annotation that indicates that a particular portion of text to be used to form a specific grammar rule indicates that the associated portion of text will not be included in an instance within the textual data set and will be included in an instance within the textual data set, wherein said annotation comprises a block to denote a sub-portion of said at least one statement for a particular purpose and wherein said block comprises a multiple block where said block can occur multiple times within said statement;
identifying, in the text represented by the textuai data set, a plurality of common elements of text;
responsive to the iterative receipt of the user selection data sets, building a target language based, at least in part upon the plurality of common elements of text;
responsive to receipt of each given user selection data set, computing a grammar using the portion of text and the annotations provided by the given user selection data set; and
wherein the user selection data sets are used for:
parsing the statement using the grammar;
creating a table with the columns, using the information extracted from the parsing the statement wherein each entry of the table corresponds to the statement.

2. The method of claim 1 further comprising:
defining a grammar of a textual Domain Specific Language, based on the target language.

3. The method of claim 2 further comprising: linking the target language to a dataset.

4. The method of claim 2 further comprising:
responsive to the definition of the grammar, highlighting, in the text corresponding to a first user selection data set of the user selection data sets, instance(s) that do not comply with the grammar.

* * * * *